United States Patent [19]

Liedek et al.

[11] Patent Number: 4,602,960
[45] Date of Patent: Jul. 29, 1986

[54] MODIFIED DIARYLIDE PIGMENTS AND THEIR PREPARATION

[75] Inventors: Egon Liedek, Esslingen; Wolfgang Ruff; Gerhard Berger, both of Stuttgart; Hans W. Sonneborn, Schwaebisch-Gmuend; Reinhard Kemper, Heidelberg, all of Fed. Rep. of Germany

[73] Assignee: BASF Farben & Fasern Aktiengesellschaft, Hamburg, Fed. Rep. of Germany

[21] Appl. No.: 641,199

[22] Filed: Aug. 16, 1984

[30] Foreign Application Priority Data

Aug. 18, 1983 [DE] Fed. Rep. of Germany ....... 3329846

[51] Int. Cl.³ ................................................ C09C 3/00
[52] U.S. Cl. ................................ 106/308 N; 106/288; 106/308 Q; 106/308 S; 534/689; 534/747
[58] Field of Search ........... 106/288 R, 308 N, 308 S, 106/308 Q; 260/180; 534/747, 760, 689, 691

[56] References Cited

U.S. PATENT DOCUMENTS

| | | | |
|---|---|---|---|
| 3,672,816 | 6/1972 | Dehnert et al. | 8/41 B |
| 3,759,731 | 9/1973 | Kühne et al. | 106/288 Q |
| 3,776,749 | 12/1973 | McKay et al. | 106/288 Q |

*Primary Examiner*—A. Lionel Clingman
*Assistant Examiner*—Willie J. Thompson
*Attorney, Agent, or Firm*—Oblon, Fisher, Spivak, McClelland & Maier

[57] ABSTRACT

A novel modified diarylide pigment contains (a) a pigment which is composed of a tetrazotized benzidine, coupled to an acetoacetarylide and/or a 1-phenyl-3-methylpyrazole-5-one, and (b) a water-soluble component obtained from a symmetric or asymmetric coupling product of a tetrazotized 4,4'-diamino-2,2'-stilbenedisulfonic acid and an acetoacetarylide and/or a 1-phenyl-3-methyl-5-pyrazolone. The novel pigments possess very good color strength, very good gloss characteristics and very good transparency, and exhibit improved printing characteristics, particularly in offset printing inks.

19 Claims, No Drawings

MODIFIED DIARYLIDE PIGMENTS AND THEIR PREPARATION

Diarylide pigments are disazo compounds which are prepared by coupling a tetrazotized benzidine, which is unsubstituted or substituted in the aromatic nucleus, with a coupling component derived from an acetoacetarylamide or from a 1-aryl-3-methyl-5-pyrazolone. The diarylide pigments prepared from variously substituted benzidines and coupling components are known under the name benzidine yellow pigment or benzidine orange pigment, and are mainly used for the production of printing inks. With regard to the stated use, the properties, such as high color strength, high gloss and good transparency, have to meet high requirements set by application technology. There are conventional processes which are intended to improve the performance characteristics of benzidine pigments.

German Pat. No. 2,012,152 discloses the preparation of a disazo pigment mixture, which is obtained by coupling tetrazotized 3,3'-dichloro-4,4'-diaminodiphenyl with one or two different non-polar, and one or two different polar, coupling components of the acetoacetarylide or 1-arylpyrazol-5-one series. In contrast to the non-polar components, the polar ones contain one or two carboxyl and/or sulfo groups. The resulting pigment mixtures are each derived from a single tetrazo component, 3,3'-dichloro-4,4'-diaminodiphenyl, and the polar groups, which may or may not contain sulfo radicals, are always in the coupling component.

German Published Application DAS No. 2,122,521 describes modified diarylide pigments which, apart from the diarylide pigment, also contain a water-soluble dye obtained from tetrazotized benzidine, coupled to a derivative of acetoacetanilide, of 1-phenyl-3-methyl-5-pyrazolone or of 2-hydroxynaphthalene-3-carboxanilide.

It is an object of the present invention to provide modified diarylide pigments which meet the above requirements and whose tinctorial properties and/or performance characteristics are superior to those of the non-modified diarylide pigments and the conventional modified diarylide pigments.

We have found that this object is achieved, and that modified diarylide pigments which possess advantageous properties and contain (a) a pigment obtained from a tetrazotized benzidine coupled to an acetoacetarylide or to a 1-phenyl-3-methyl-5-pyrazolone which may or may not be substituted in the phenyl nucleus, and (b), incorporated into this, a water-soluble component or its salt, are obtained if the said component (b) is a symmetric or asymmetric coupling product of a tetrazotized 4,4'-diamino2,2'-stilbenedisulfonic acid (referred to below as flavonic acid) and unsubstituted or substituted acetoacetarylides and/or 1-phenyl-3-methyl-5-pyrazolones which are unsubstituted or substituted in the phenyl nucleus.

The pigments of the stated type possess very good color strength, very good gloss characteristics, excellent transparency, and improved printing characteristics, particularly in offset printing. For example, it is possible to avoid troublesome spraying of the printing ink in high-speed machines.

Furthermore, the novel pigments and the novel processes for the preparation of these pigments constitute an enrichment of the art, since the novel processes give higher-performance pigments even in cases where the performance of the conventional processes is restricted.

Using the pigments according to the invention, it is also possible to improve the rheological properties, particularly in the case of liquid printing inks. Another advantage of the diarylide pigments modified according to the invention is their outstanding stability in respect of the transparency during dispersing at elevated temperatures.

The amount of component (b) in the modified diarylide pigments of the invention is not critical, provided that the amount present effects an improvement in the performance characteristics and/or tinctorial properties. In general, amounts of from 0.5 to 5% by weight, based on (a), of (b) is sufficient. The content of (b) is preferably from 1 to 3% by weight, based on (a).

It is also possible to use larger amounts of (b), but these have no further advantages with regard to performance characteristics and/or tinctorial properties.

In addition to containing (a) and (b), the diarylide pigments modified according to the invention can also contain other additives, for example resins or their derivatives and surfactants. Suitable additives are prior art ones. The modified diarylide pigments according to the present invention also include those diarylide pigments (a) which consist of one or more diarylide pigments and are formed by either mechanical mixing or mixed coupling. For example, diarylide pigments modified according to the invention can be synthesized from the components of C.I. Pigment Yellow 13 and 17 by mixed coupling.

The diarylide pigments (a) on which the modified diarylide pigments according to the invention are based are known. For reasons relating to performance characteristics, the following should be particularly singled out:

C.I. Pigment Yellow 12, C.I. No. 21090;
C.I. Pigment Yellow 13, C.I. No. 21100;
C.I. Pigment Yellow 14, C.I. No. 21095;
C.I. Pigment Yellow 17, C.I. No. 21105;
C.I. Pigment Yellow 83, C.I. No. 21108;
C.I. Pigment Orange 34, C.I. No. 21115 and mixed coupling products of tetrazotized 3,3'-dichloro-4,4'-diaminodiphenyl with the coupling components present in the abovementioned pigments.

The novel modified diarylide pigments can be prepared by various methods.

(1) The water-soluble component (b) can be prepared separately and the diarylide pigment (a) mixed with this,
(2) the separately prepared component (b) can be added to the tetrazo solution used for the preparation of the diarylide pigment (a), or to the coupling component, or
(3) the component (b) can be prepared together with the diarylide pigment (a) by simultaneous coupling.

In the case of process variant (3), pigment (a) and component (b) contain the same coupling components. In the industrial production of the novel modified diarylide pigments, this variant has economic advantages since the preparation is carried out by a single-vessel process.

Using process variant (1), it is possible to prepare modified diarylide pigments in which the pigment (a) and the component (b) contain different coupling components from the series comprising the acetoacetanilides and/or phenylpyrazolones.

In process variant (1), it is advantageous to mix the component (b) with a suspension of the pigment (a) and then to isolate the modified diarylide pigment.

It is sometimes advantageous to prepare the modified diarylide pigment by variant (2).

In principle, there are also other possible methods of mixing the diarylide pigment with the coupling product obtained from the tetrazotized flavonic acid.

The coupling product obtained from the tetrazotized flavonic acid possesses comparatively low water-solubility, with the result that it can be separated off by filtration. However, equally good results are obtained if alkaline solutions are used, particularly good results sometimes being obtained if the potassium salt is used. The fact that improved diarylide pigments can be obtained using the process according to the invention is surprising, since the coupling products used according to the invention and obtained from tetrazotized flavonic acid are not dyes from a tinctorial point of view and frequently give an unattractive brownish hue. It was also surprising that, in spite of the brownish hue obtained when an adequate amount of the coupling component of tetrazotized flavonic acid is added, no disadvantageous color changes occurred in the modified pigment.

The Examples which follow illustrate the invention. Percentages are by weight.

EXAMPLE 1

(A) Component (b)

(A1) Tetrazotization 5.25 parts by weight of 4,4'-diamino-2,2'-stilbenedisulfonic acid are dissolved in 30 parts by volume of 1N sodium hydroxide solution, 14.2 parts by volume of 2N sodium nitrite solution are added, and this mixture is added dropwise to 126 parts by volume of 0.5N hydrochloric acid at 0° C., while stirring. The tetrazotization is complete after about 45 minutes. If required, a further, small amount of sodium nitrite solution is added subsequently.

(A2) Coupling 5.95 parts by weight of acetoacet-2,4-dimethylanilide are dissolved in 42 parts by volume of 0.8N sodium hydroxide solution, and are reprecipitated by adding 44 parts by volume of 0.8N acetic acid. The suspension obtained in the tetrazotization (A1) is added dropwise, in the course of 30 minutes, to this supension, the pH of the reaction medium being kept at 6 by simultaneously adding 10% strength sodium hydroxide solution. The coupling is carried out at 20° C.

(B) Pigment (B1) Tetrazotization 14 parts by weight of 3,3'-dichloro-4,4'-diaminodiphenyl in 830 parts by volume of 0.4N hydrochloric acid are tetrazotized at 0° C. with 7.7 parts by weight of sodium nitrite, and excess sodium nitrite is removed with amidosulfonic acid. Before the beginning of coupling, 8% of the suspension of the disazostilbene compound obtained in reaction (A) is added to the tetrazo solution, which has been clarified beforehand.

(B2) Coupling 23.2 parts by weight of acetoacet-2,4-dimethylanilide are dissolved in 150 parts by volume of 1.5N sodium hydroxide solution. 160 parts by volume of 0.5N acetic acid are initially taken in the coupling vessel, and the coupling component dissolved in the alkaline medium is added to the acetic acid in an amount such that the pH reaches 5. The tetrazo solution from (B1) and the remaining solution of the coupling component are then simultaneously run into the reaction vessel, the pH being kept constant at 5 and the temperature being maintained at 20° C. When all the coupling component has been added, the pH decreases to 3.5 when the remaining tetrazo solution is added. When coupling is complete, the pigment suspension is neutralized by adding 10% strength sodium hydroxide solution. A solution of 16.6 parts by weight of partially hydrogenated resin in 200 parts by volume of 0.3N sodium hydroxide solution is then added, the mixture is boiled for 15 minutes, and the resin and the acidic disazostilbene compound are then precipitated at pH 5 by adding 10% strength hydrochloric acid. The end product is filtered off, washed thoroughly with water and dried at from 50° to 60° C.

When used in an offset printing ink, the pigment modified in this manner exhibited substantially better transparency and higher color strength than a pigment prepared in the same manner but without the addition of a disazostilbene compound obtained according to reaction A. Furthermore, the pigment prepared according to the invention exhibited a smaller loss in transparency when milled in a stirred ball mill at elevated temperatures. In the printing process on a high-speed offset printing press, the undesirable spraying which takes place when an ink containing the pigment prepared as described in B2 is used took place to a substantially smaller extent.

EXAMPLE 2

Reactions A and B were carried out as described in Example 1, with the difference that, after the pigment had been subjected to heat treatment at the boiling point, the resin, and the disazostilbene compound added to the tetrazo solution B1, were precipitated by adding a solution of 3.8 parts by weight of calcium chloride in 30 parts by volume of water.

When used in offset printing inks, the isolated, dried pigment displayed the advantageous properties described in Example 1, the spraying behavior of the offset printing press being further improved.

EXAMPLE 3

3.1 Tetrazotization A 0.42 part by weight of 4,4'-diamino-2,2'-stilbenedisulfonic acid are tetrazotized by the method given in Example 1, A1 (tetrazotization).

3.2 Tetrazotization B 14 parts by weight of 3,3'-dichloro-4,4'-diaminodiphenyl in 830 parts by volume of 0.4N hydrochloric acid are tetrazotized at 0° C. with 7.7 parts by weight of sodium nitrite. The tetrazo solution is clarified, and excess sodium nitrite is removed with amidosulfonic acid.

3.3 Coupling (pigment)

23.2 parts by weight of acetoacet-2,4-dimethylanilide are dissolved in 150 parts by volume of 1.5N sodium hydroxide solution. 150 parts by volume of 0.5N acetic acid are initially taken in the coupling vessel, and the coupling component dissolved in the alkaline medium is added to the acetic acid in an amount such that the pH reaches 5. The tetrazo solution B and the remaining solution of the coupling component are then run into the reaction vessel, the pH being kept constant at 5 and the temperature being maintained at 20° C. When all the coupling component has been added, the pH decreases to 3.5 when the remaining tetrazo solution is added.

When coupling is complete, the pH of the pigment suspension is brought to 10 by adding 10% strength sodium hydroxide solution. The suspension obtained in the tetrazotization A is then added in the course of 10 minutes, after which a solution of 16.6 parts by weight of partially hydrogenated resin in 200 parts by volume of 0.3N sodium hydroxide solution is added to the reaction mixture, and the suspension is heated to 100° C. and kept at the boiling point for 15 minutes. Finally, the resin and the acidic disazostilbene compound are precipitated at pH 5 by adding 10% strength hydrochloric acid. The end product is filtered off, washed thoroughly with water and dried at from 50° to 60° C. (modified Pigment Yellow 13).

When used in offset printing inks, the product exhibits the advantageous properties stated in Example 1.

EXAMPLE 4

The modified pigment was synthesized as described in Example 3, except that it was precipitated after the heat treatment by adding a solution of 3.8 parts by weight of calcium chloride in 30 parts by volume of water. When used in offset printing inks, the isolated, dried pigment exhibited the advantageous properties described in Example 2.

EXAMPLE 5

(A) Component (b)

(A1) Tetrazotization 5.25 parts by weight of 4,4'-diamino-2,2'-stilbenedisulfonic acid are dissolved in 30 ml of 1N sodium hydroxide solution, 14.2 parts by volume of 2N sodium nitrite solution are added, and this mixture is added dropwise to 126 parts by volume of 0.5N hydrochloric acid at 0° C., while stirring. The tetrazotization is complete after 45 minutes. If required, a further, small amount of sodium nitrite solution is added subsequently.

(A2) Coupling 5.13 parts by weight of acetoacetanilide are dissolved in 42 parts by volume of 0.8N sodium hydroxide solution, and are reprecipitated by adding 44 parts by volume of 0.8N acetic acid. The suspension obtained in the tetrazotization A1 is added dropwise, in the course of 30 minutes, to this suspension, the pH of the reaction medium being kept at 6 by adding 10% strength sodium hydroxide solution. The coupling is carried out at 20° C.

(B) Pigment (B1) Tetrazotization 14 parts by weight of 3,3'-dichloro-4,4'-diaminodiphenyl in 830 parts by volume of 0.4N hydrochloric acid are tetrazotized at 0° C. with 7.7 parts by weight of sodium nitrite, and excess sodium nitrite is removed with amidosulfonic acid. Before the beginning of coupling, 12% of the suspension of the disazostilbene compound obtained in reaction A is added to the tetrazo solution, which has been clarified beforehand.

(B2) Coupling 23.2 parts by weight of acetoacet-2,4-dimethylanilide are dissolved in 150 parts by volume of 1.5N sodium hydroxide solution. 150 parts by volume of 0.5N acetic acid are initially taken in the coupling vessel, and the coupling component dissolved in the alkaline medium is added to the acetic acid in an amount such that the pH reaches 5. The tetrazo solution B1 and the remaining solution of the coupling component are then simultaneously run into the reaction vessel, the pH being kept constant at 5 and the temperature being maintained at 20° C. When all the coupling component has been added, the pH decreases to 3.5 when the remaining tetrazo solution is added. When coupling is complete, the suspension is heated to 100° C. and kept at the boil for 15 minutes. The product is filtered off, washed thoroughly with water and dried at from 50° to 60° C.

When used in an offset printing ink, the pigment modified in this manner exhibits substantially better transparency and higher color strength than a pigment prepared in the same manner but without the addition of a disazostilbene compound.

EXAMPLE 6

6.1 Tetrazotization 14 parts by weight of 3,3'-dichloro-4,4'-diaminodiphenyl in 830 parts by volume of 0.4N hydrochloric acid are tetrazotized at 0° C. with 7.7 parts by weight of sodium nitrite, excess sodium nitrite being removed with amidosulfonic acid. Before the beginning of coupling, 3.5% of the suspension of the disazostilbene compound obtained as described in Example 1A is added to the tetrazo solution, which has been clarified beforehand.

6.2 Coupling 23.2 parts by weight of acetoacet-2,4-dimethylanilide are dissolved in 150 parts by volume of 1.5N sodium hydroxide solution. 180 parts by volume of 0.5N acetic acid are initially taken in the coupling vessel, and 0.5 part by weight of N,N'-pentamethyl-N-tallow fat-1,3-propanediammonium chloride and 2 parts by weight of a mixture of resin amines known under the trade name Amine D are dissolved in the acetic acid.

The coupling component dissolved in the alkaline medium is then added to the acetic acid in an amount such that the pH reaches 4.5. The tetrazo solution and the remaining solution of the coupling component are then simultaneously run into the reaction vessel, the pH being kept constant at 4.5 and the temperature being maintained at 20° C. After all the coupling component has been added, the pH decreases to 3.5 when the remaining tetrazo solution is added.

When coupling is complete, the pigment suspension is heated to 100° C. and kept at the boiling point for 30 minutes. The end product is filtered off, washed thoroughly with water and dried at from 50° to 60° C. The modified pigment obtained in this manner is milled for 60 minutes in a Red Devil with a gravure printing varnish based on nitrocellulose to produce an 8% strength pigmented product; in this product, the pigment exhibits substantially more advantageous flow behavior, and higher gloss and better transparency on polyethylene film, than a pigment prepared without the addition of the disazostilbene compound.

EXAMPLE 7

7.1 Tetrazotization A 0.42 part by weight of 4,4'-diamino-2,2'-stilbenedisulfonic acid are tetrazotized by the method given in Example 1, A1 (tetrazotization).

7.2 Tetrazotization B 14 parts by weight of 3,3′-dichloro-4,4′-diaminodiphenyl are tetrazotized using the method described in Example 3, tetrazotization B.

7.3 Coupling 20.4 parts by weight of acetoacetanilide are dissolved in 150 parts by volume of 1.5N sodium hydroxide solution. 150 parts by volume of 0.5N acetic acid are initially taken in the coupling vessel, and the coupling component dissolved in the alkaline medium is added to the acetic acid in an amount such that the pH reaches 5. The tetrazo solution B and the remaining solution of the coupling component are then run into the reaction vessel, the pH being kept constant at 5 and the temperature being maintained at 20° C. When all the coupling component has been added, the pH decreases to 3.5 when the remaining tetrazo solution is added. When coupling is complete, the pH of the pigment suspension is brought to 10 by adding 10% strength sodium hydroxide solution. The suspension obtained in the tetrazotization A is then added in the course of 10 minutes, after which a solution of 15.3 parts by weight of partially hydrogenated rosin in 190 parts by volume of 0.3N sodium hydroxide solution is added to the reaction mixture, and the suspension is heated to 100° C. and kept at the boiling point for 15 minutes. Finally, the resin and the acidic disazostilbene compound are precipitated at pH 5 by adding 10% strength hydrochloric acid. The pigment is filtered off, washed thoroughly with water and dried at from 50° to 60° C.

When used in an offset printing ink, the pigment modified in this manner exhibits substantially better transparency and higher color strength than a pigment prepared in the same manner but without the addition of a disazostilbene compound. When milled in a stirred ball mill with exposure to heat, the pigment according to the invention showed a smaller loss of transparency. When an ink pigmented with the pigment according to the invention was used for printing on a high-speed offset printing press, the undesirable spraying occurred to a substantially smaller extent.

EXAMPLE 8

The pigment was synthesized as described in Example 7, except that the pigment obtained after the heat treatment, the resin and the disazostilbene compound were precipitated from the warm solution by adding a solution of 3.5 parts by weight of calcium chloride in 30 parts by volume of water.

When used in offset printing inks, the isolated, dried pigment exhibited the advantageous properties described in Example 7, the spray behavior during printing on the offset printing press being further improved.

EXAMPLE 9

9.1 Tetrazotization 14 parts by weight of 3,3′-dichloro-4,4′-diaminodiphenyl in 830 parts by volume of 0.4N hydrochloric acid are tetrazotized at 0° C. with 7.7 parts by weight of sodium nitrite, excess sodium nitrite being removed with amidosulfonic acid. Before the beginning of coupling, 8% of the suspension of the disazostilbene compound obtained as described in Example 5A is added to the tetrazo solution, which has been clarified beforehand.

9.2 Coupling 20 parts by weight of acetoacetanilide are dissolved in 150 parts by volume of 1.5N sodium hydroxide solution. 150 parts by volume of 0.5N acetic acid are initially taken in the coupling vessel, and the coupling component ponent dissolved in the alkaline medium is added to the acetic acid in an amount such that the pH reaches 5. The tetrazo solution and the remaining solution of the coupling component are then run into the reaction vessel, the pH being kept constant at 5 and the temperature being maintained at 20° C. When all the coupling component has been added, the pH decreases to 3.5 when the remaining tetrazo solution is added. When coupling is complete, the pigment suspension is neutralized by adding 10% strength sodium hydroxide solution. A solution of 6.3 parts by weight of partially hydrogenated rosin in 80 parts by volume of 0.3N sodium hydroxide solution is then added, and the mixture is heated to 100° C. and kept at the boil for 15 minutes. The resin and the acidic disazostilbene compound are then precipitated at pH 5 by adding 10% strength hydrochloric acid. The product is filtered off, washed thoroughly with water and dried at from 50° to 60° C. The tinctorial and printing properties of the resulting modified pigment differ from the corresponding properties of a pigment prepared in a similar manner but without the addition of the disazostilbene compound, in the same way that the pigment obtained as described in Example 7 differs from the corresponding comparative pigment.

EXAMPLE 10

The process, described in Example 3, for the preparation of the modified C.I. Pigment Yellow 13 was employed for C.I. Pigment Yellow 14, the following starting materials being used:

10.1

The tetrazotizations A and B were carried out as in Example 3.

10.2 Coupling 22.0 parts by weight of acetoacet-2-methylanilide are used instead of 23.7 parts by weight of acetoacet-2,4-dimethylanilide, and 16.0 parts by weight of partially hydrogenated resin were employed instead of 16.6 parts by weight of this resin. When used in an offset printing ink, the resulting modified pigment exhibited advantageous properties similar to those of the pigment described in Example 1.

EXAMPLE 11

In this Example, the process, described in Example 3, for the preparation of the modified C.I. Pigment Yellow 13 was employed for C.I. Pigment Yellow 83.

The tetrazotizations A and B were carried out as described in Examples 3.1 and 3.2.

The coupling was carried out as described in Example 3.3 except that 32.2 parts by weight of acetoacet-2,5-dimethoxy-4-chloroanilide were used instead of 23.7 parts by weight of acetoacet-2,4-dimethylanilide, and 11.3 parts by weight of partially hydrogenated resin in 140 parts by volume of 0.3N sodium hydroxide solution were employed instead of a solution of 16.6 parts by weight of this resin in 200 parts by volume of 0.3N sodium hydroxide solution. When used in an offset printing ink, the resulting pigment exhibited the same advantageous properties as the pigment described in Example 1.

EXAMPLE 12

The process, described in Example 3, for the preparation of the modified C.I. Pigment Yellow 13 was employed for C.I. Pigment Orange 34, the following starting materials being used:

12.1

The tetrazotizations A and B were carried out as in Examples 3.1 and 3.2.

12.2 Coupling 22.0 parts by weight of 1-p-tolyl-3-methylpyrazol-5-one were employed instead of 23.7 parts by weight of acetoacet-2,4-dimethylanilide. The coupling of the tetrazotized 3,3'-dichloro-4,4'-diaminodiphenyl was carried out at pH 4.5, and the subsequent coupling of tetrazotized 4,4'-diamino-2,2'-stilbenedisulfonic acid was carried out at pH 11.

In contrast to Example 3, a resin was not added to the pigment suspension; instead, when coupling was complete, the suspension was immediately brought to pH 5 by adding dilute hydrochloric acid, and was then heated to 100° C. and kept at the boil for 20 minutes.

When used in an offset printing ink, the product exhibited substantially better transparency and higher color strength than a sample which did not contain any coupling product obtained from tetrazotized 4,4'-diamino-2,2'-stilbenedisulfonic acid and 1-p-tolyl-3-methylpyrazol-5-one.

EXAMPLE 13

13.1 Tetrazotization 14 parts by weight of 3,3'-dichloro-4,4'-diaminodiphenyl were tetrazotized by a method similar to that described in Example 3.2, tetrazotization.

13.2 Coupling

A mixture of 22.0 parts by weight of acetoacet-2,4-dimethylanilide and 1.2 parts by weight of acetoacet-2-methoxyanilide were dissolved in 150 parts by volume of 1.5N sodium hydroxide solution, and 150 parts by volume of 0.5N acetic acid were initially taken in the coupling vessel. The coupling component dissolved in the alkaline medium is then added to the acetic acid in an amount such that the pH reaches 5. Thereafter, the tetrazo solution and the remaining solution of the coupling component were allowed to run into the reaction vessel, with the pH being kept constant at 5 and the temperature at 20° C. After all of the coupling component had been added, the pH dropped, on addition of the remaining tetrazo solution, to 3.5. After completion of coupling, the pH of the pigment suspension was brought to 10 by adding 10% strength sodium hydroxide solution. Thereafter, 12% of the suspension of the disazostilbene compound obtained in Example 1A were added, followed by a solution of 26.2 parts by weight of partially hydrogenated rosin in 320 parts by volume of 0.3 N sodium hydroxide solution. The suspension was heated to 100° C. and kept at the boil for 15 minutes. Finally, the resin and the acid disazostilbene compound were precipitated at pH 5 by adding 10% hydrochloric acid. The end product was filtered off, washed with water and dried at 50°–60° C. The resulting modified pigment exhibited the same advantageous properties in an offset ink as did the pigment described in Example 1.

EXAMPLE 14

14.1 Tetrazotization A 0.42 part by weight of 3,3'-dimethoxy-4,4'-diaminodiphenyl in 20 parts by volume of 0.4 N hydrochloric acid were tetrazotized with 0.24 part by weight of sodium nitrite at 0° C.

14.2 Tetrazotization B 14 parts by weight of 3,3'-dichloro-4,4'-diaminodiphenyl were tetrazotized in a manner corresponding to Example 3.2, Tetrazotization.

14.3 Coupling 20.6 parts by weight of acetoacetanilide were dissolved in 155 parts by volume of 1.5 N sodium hydroxide solution. 155 parts by volume of 0.5 N acetic acid were initially introduced into the coupling vessel. Sufficient of the coupling component, dissolved in alkali, was added to the acetic acid to give a pH of 5. Thereafter, the mixture of the tetrazo solutions A+B and the remaining solution of the coupling component were allowed to run simultaneously into the reaction vessel, while the pH was kept at 5 and the temperature at 20° C. After addition of the coupling component, the pH dropped to 3.5 on addition of the remainder of the tetrazo solution.

After completion of coupling, the pH of the pigment suspension was brought to 10 by adding 10% strength sodium hydroxide solution, and thereafter 8% of the suspension of the disazostilbene compound obtained according to Example 5A, and a solution of 4.1 parts by weight of partially hydrogenated rosin in 50 parts by volume of 0.3N sodium hydroxide solution, were added to the pigment suspension. The mixture was heated to 100° C. and kept at the boil for 30 minutes. Finally, the pH was brought to 5 by adding dilute hydrochloric acid and the mixture was stirred for a further 15 minutes at 100° C. It was then cooled to 60° C. by adding cold water, and the pigment was filtered off and washed. The press cake was dried at 50°–60° C. The modified pigment obtained has a more reddish hue than that obtained according to Example 7, while having, in other respects, virtually the same good properties in offset printing inks.

We claim:

1. A modified diarylide pigment, essentially containing (a) a pigment which is composed of a tetrazotized benzidine, coupled to an acetoacetarylide or to a 1-phenyl-3-methyl-5-pyrazolone which is unsubstituted or substituted in the phenyl nucleus, and (b), incorporated into (a), a water-soluble component obtained from a symmetric or asymmetric coupling product of a tetrazotized 4,4'-diamino-2,2'-stilbenedisulfonic acid and one or more unsubstituted or substituted acetoacetarylides or 1-phenyl-3-methylpyrazol-5-ones which are unsubstituted or substituted in the phenyl nucleus.

2. A modified diarylide pigment as claimed in claim 1, wherein (b) contains the same coupling component as the pigment (a).

3. A modified diarylide pigment as claimed in claim 1, wherein (b) is a coupling product of tetrazotized 4,4'-diamino-2,2'-stilbenedisulfonic acid.

4. A modified diarylide pigment as claimed in claim 2, wherein (b) is a coupling product of tetrazotized 4,4'-diamino-2,2'-stilbenedisulfonic acid.

5. A modified diarylide pigment as claimed in claim 1, which contains from 0.5 to 5% by weight, based on (a), of (b).

6. A modified diarylide pigment as claimed in claim 2, which contains from 0.5 to 5% by weight, based on (a), of (b).

7. A modified diarylide pigment as claimed in claim 1, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

8. A modified diarylide pigment as claimed in claim 2, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

9. A modified diarylide pigment as claimed in claim 3, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

10. A mbdified diarylide pigment as claimed in claim 4, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

11. A modified diarylide pigment as claimed in claim 5, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

12. A modified diarylide pigment as claimed in claim 6, wherein (a) is a coupling product obtained from tetrazotized 3,3'-dichloro-4,4'-diaminodiphenyl, or from a mixture of 3,3'-dichloro-4,4'-diaminodiphenyl with 3,3'-dimethoxy-4,4'-diaminodiphenyl, and one or more acetoacetanilides or a 1-phenyl-3-methylpyrazol-5-one.

13. A modified diarylide pigment, essentially containing (a) a pigment which is composed of tetrazotized 3,3'-dichloro-4,4'-diaminodiphenyl, or of a mixture of 3,3'-dichloro-4,4'-diaminodiphenyl with 3,3'-dimethoxy-4,4'-diaminodiphenyl, coupled to acetoacetanilide, acetoacet-2,4-xylidide, acetoacet-o-toluidide, acetoacet-o-anisidide, acetoacet-(4-chloro-2,5-dimethoxyanilide), 3-methyl-1-p-tolylpyrazol-5-one or a mixture of these, and (b) a water-soluble component obtained from a symmetric or asymmetric coupling product of tetrazotized 4,4'-diamino-2,2'-stilbenedisulfonic acid with acetoacetanilide, acetoacet-2,4-xylidide, acetoacet-o-toluidide, acetoacet-o-anisidide, acetoacet-(4-chloro-2,5-dimethoxyanilide) or 3-methyl-1-p-tolylpyrazol-5-one.

14. A modified diarylide pigment as claimed in claim 13, which contains from 0.5 to 5% by weight, based on (a), of (b).

15. A modified diarylide pigment as claimed in claim 13, which contains from 1 to 3% by weight, based on (a), of (b).

16. A modified diarylide pigment as claimed in claim 13, which contains, in addition to (a) and (b), a resin, a derivative of a resin, a surfactant or a mixture of these.

17. A modified diarylide pigment as claimed in claim 13, which contains, in addition to (a) and (b), rosin, partially hydrogenated rosin or a quaternary ammonium salt of a tallow fatty amine.

18. A process for the preparation of a modified diarylide pigment as claimed in claim 1, wherein the water-soluble component (b) or its salt is added either to the tetrazo solution used for the preparation of the pigment (a) or to the coupling component, and, when coupling is complete, the modified diarylide pigment is isolated, or (b) is added to the pigment after it has been formed, and the modified diarylide pigment is isolated.

19. A process for the preparation of a modified diarylide pigment as claimed in claim 1, wherein (b) is prepared in the same reaction medium as the pigment (a), by adding a tetrazotized 4,4'-diamino-2,2'-stilbenedisulfonic acid, before, during or after the coupling of the pigment (a), to the mixture which contains an excess of the coupling component, and the modified diarylide pigment is then isolated.

* * * * *